Figure 1:
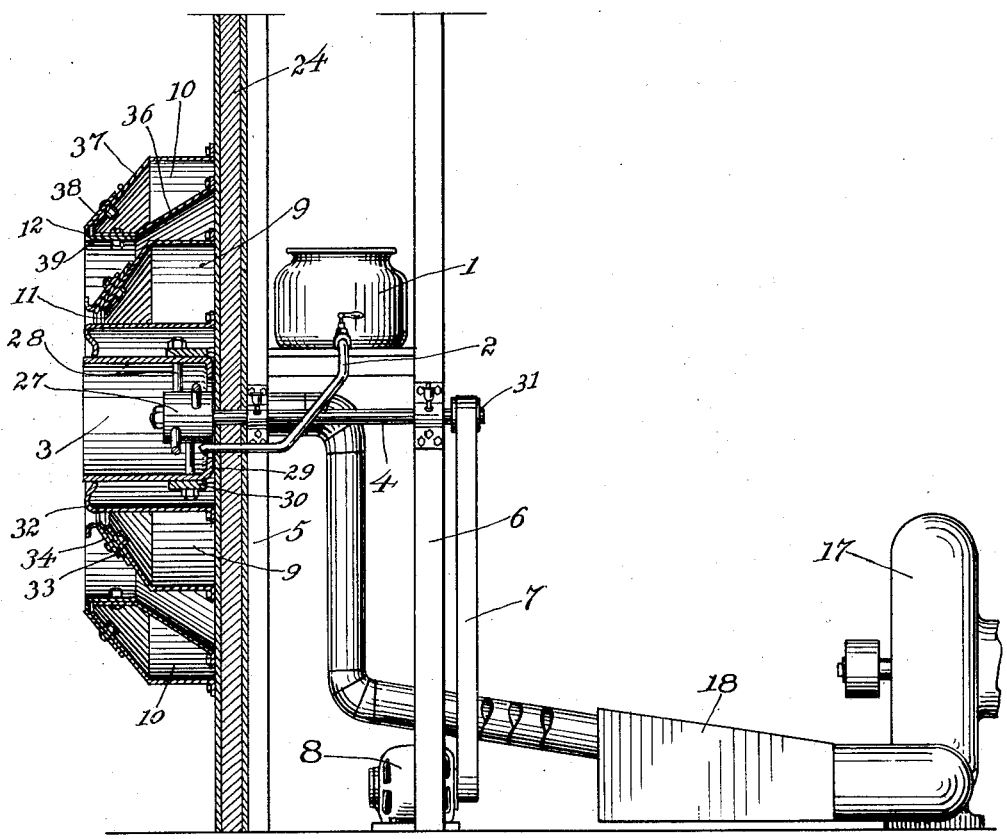

J. C. MILLER.
APPARATUS FOR THE DRYING OF LIQUIDS AND SEMILIQUIDS.
APPLICATION FILED MAY 10, 1918.

1,407,701.

Patented Feb. 28, 1922.

2 SHEETS—SHEET 1.

Inventor:
John C. Miller
By Allen & Allen
Attorneys.

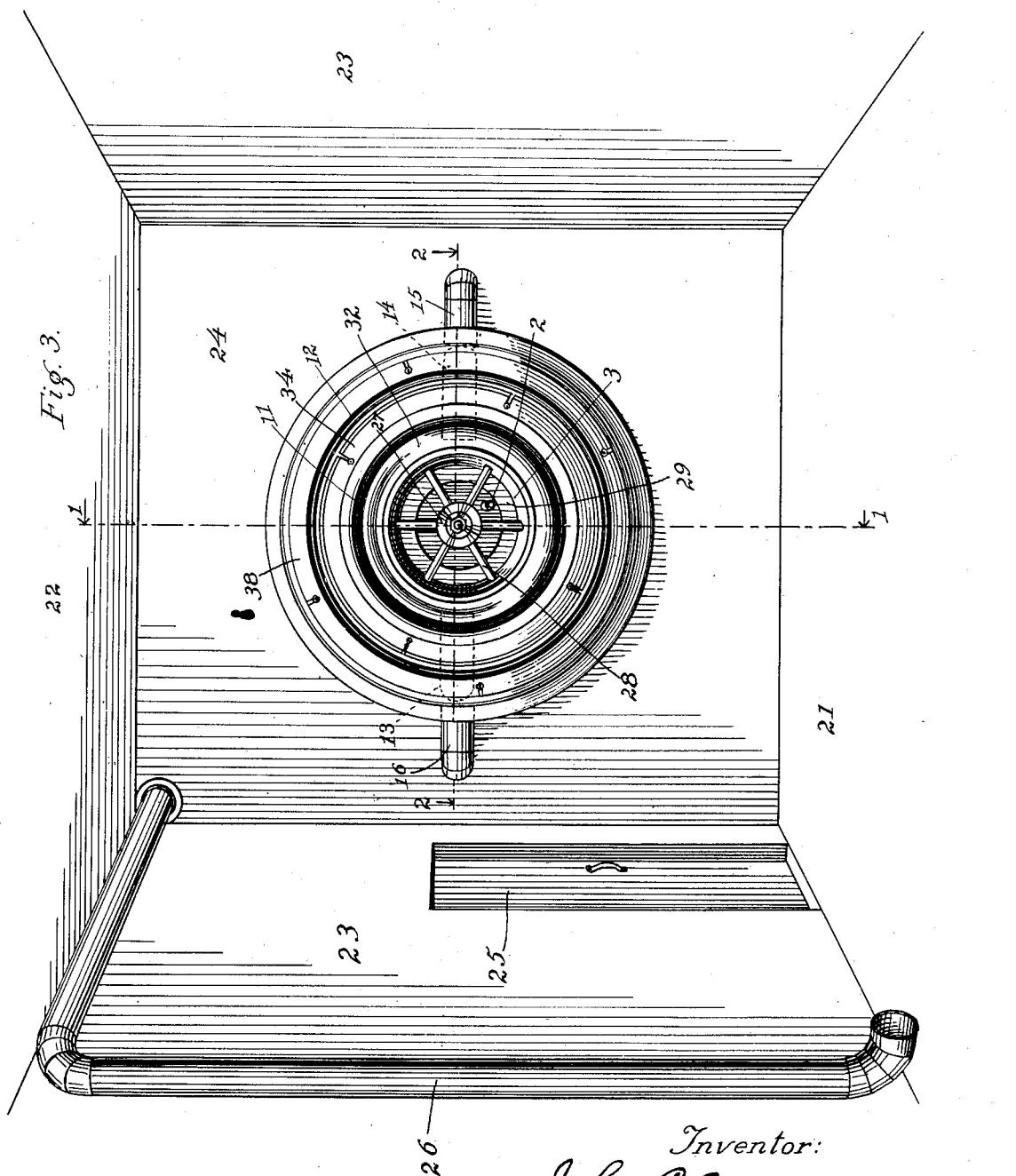

UNITED STATES PATENT OFFICE.

JOHN C. MILLER, OF COVINGTON, KENTUCKY, ASSIGNOR TO THE EVAPORATING AND DRYING MACHINERY COMPANY, OF CINCINNATI, OHIO, A CORPORATION OF OHIO.

APPARATUS FOR THE DRYING OF LIQUIDS AND SEMILIQUIDS.

1,407,701.    Specification of Letters Patent.    Patented Feb. 28, 1922.

Application filed May 10, 1918  Serial No. 233,745.

*To all whom it may concern:*

Be it known that I, JOHN C. MILLER, a citizen of the United States, and a resident of Covington, in the county of Kenton and State of Kentucky, have invented certain new and useful Improvements in the Apparatus for the Drying of Liquids and Semi-Liquids, of which the following is a full, clear, and exact description, reference being made to the accompanying drawings, forming part of this specification.

The object of my invention is to provide apparatus in which the moisture from liquids and semi-liquids can be very rapidly removed in order to convert the solid constituents of the liquid or semi-liquid into a dry powder.

My invention consists of that certain novel construction and arrangement of parts to be hereinafter particularly pointed out and claimed, whereby the liquid or semi-liquid can be very rapidly dried to a powdery form.

Figure 2:
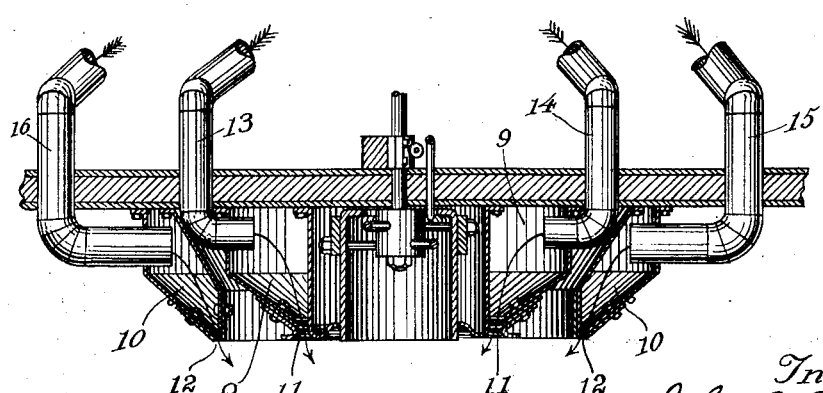

In the drawings,

Figure 1 is a central vertical section and Figure 2 is a central horizontal section of the apparatus taken on the lines 1, 1, and 2, 2, respectively as shown in Figure 3 in front elevation as viewed from inside the collecting chamber, which chamber is shown in perspective in Figure 3.

A closed collecting room for the dried material is provided of such size as may be desired, with floor 21, ceiling 22, side walls 23, 23, and end walls 24. This room is provided with a door 25 for convenient access thereto and with the pipe 26 to carry off the heated air forced into the room, as will be described. Mounted in standards 5, 6, immediately outside of one of the end walls 24 of the room, is a horizontal shaft 4. This shaft projects through the wall 24 and carries a hub 27 to which is secured by the spokes 28 a cylinder 3, open at its forward end and formed with an inturned flange 29 on the inside. This cylinder is preferably slightly larger in diameter at its open end than at the flanged end, although, if desired, the cylinder may be of the same diameter throughout. As the cylinder is of comparatively thin metal, I provide a strengthening band 30 through which the ends of the spokes pass where they are secured by nuts. This cylinder 3 is driven at a very high rate of speed by the pulley 31 on the shaft 4, driven by a belt 7 connecting with an electric motor 8. Of course, however, the shaft may be driven in any other suitable way from other sources of power. Bolted to the wall 24, surrounding the cylinder 3, is an annular casing 32, which forms with the annular casing 33 of larger diameter than the casing 32, which is likewise secured to the wall 24 concentric with the cylinder, an annular compartment 9. This second casing 33 is bent inwardly towards the casing 32, leaving an annular opening 11 between the two casings, and in order to regulate the width of this opening I secure by a slot and bolt construction an annular plate 34 which can be adjusted towards or away from the casing 32. At this opening 11 the edges of the casings are overturned so as to provide an annular smooth outlet from the compartment 9. Outside of this first compartment 9 and concentric therewith is formed another annular compartment 10 by the casings 36, 37, which are also secured to the wall 24 and which incline towards each other so as to form an annular outlet 12, and at this outlet annular plates 38, 39, are provided, secured by a bolt and slot connection with the casings 37 and 36 respectively, so that the width of the annular opening 12 may be adjusted and controlled.

Opening into these annular compartments 9 and 10 are the pipes 13, 14, 15 and 16, which are connected outside the chamber with a distributor 18, through which very powerful blasts of heated air are driven by the blower 17, the incoming air to the blower passing over radiators of any desired construction, not shown in the drawings, where the air is heated to a high degree.

Mounted in the standards 5, 6, is a receptacle 1, for the liquid or semi-liquid to be treated, and this liquid is delivered by the pipe 2 which passes through the wall 24 to the inside of the cylinder 3.

In order to remove the moisture from the liquid as it is delivered to the inside of the cylinder, the cylinder is rotated at a very high rate of speed, and by centrifugal force the liquid to be treated is thrown off the edge of the open end of the cylinder in a cone-shaped mist. At the same time blasts of heated air are discharged under the action of the blower from the compartments 9 and 10 directly across this cone-shaped spray. The liquid is brought into so fine a state of division by the whirling of the cylinder 3 with the blasts of heated air directed across this exceedingly thin sheet of liquid that the moisture is immediately taken up by the heated air and the material is deposited in the shape of a dry powder on the floor of the collecting chamber, whence it may be removed as desired.

Having thus described my invention, what I claim as new and desire to secure by Letters Patent, is:—

1. In an apparatus of the character specified, the combination with a cylinder having an open end, and means for rotating same at a high rate of speed, of a casing surrounding the open end of the cylinder, with an annular opening therefor, means for adjusting the width of the opening, means for delivering the material to be treated upon the internal surface of the cylinder during the rotation thereof, and means for injecting a current of air through the annular opening transverse the material delivered centrifugally from the open end of the cylinder.

2. In an apparatus of the character specified, the combination with a comparatively short cylinder having an open end, and means for rotating same at a high rate of speed, of a plurality of casings surrounding the open end of the cylinder with annular openings concentric with the axis of the cylinder around the open end of the cylinder, means for delivering the material to be treated upon the internal surface of the cylinder during the rotation thereof, and means for injecting a current of air convergingly through the annular opening transverse the material delivered centrifugally from the open end of the cylinder.

3. In an apparatus of the character specified, the combination with a cylinder having an open end, and means for rotating same at a high rate of speed, of a plurality of casings surrounding the open end of the cylinder with annular openings concentric with the axis of the cylinder, means for adjusting the width of the openings, means for delivering the material to be treated upon the internal surface of the cylinder during the rotation thereof, and means for injecting a current of air through the annular opening transverse the material delivered centrifugally from the open end of the cylinder.

4. In an apparatus of the character specified, the combination with a cylinder having an open end, and means for rotating same at a high rate of speed, of a plurality of casings surrounding the open end of the cylinder with annular openings concentric with the axis of the cylinder, means for adjusting the width of the openings, means for delivering the material to be treated upon the internal surface of the cylinder during the rotation thereof, and a blower with pipes therefrom to said casings for injecting a current of heated air through the annular openings transverse the material delivered contrifugally from the open end of the cylinder.

JOHN C. MILLER.